(12) United States Patent
Sitaram et al.

(10) Patent No.: US 12,166,536 B2
(45) Date of Patent: Dec. 10, 2024

(54) WEATHER IMPACT MODELING OF SATELLITE BASED SERVICES

(71) Applicant: HUGHES NETWORK SYSTEMS, LLC, Germantown, MD (US)

(72) Inventors: Shivaram Sitaram, Germantown, MD (US); Will Highfield, Germantown, MD (US); Rajeev Kubba, Germantown, MD (US); Hongyangyang Shi, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 508 days.

(21) Appl. No.: 17/548,319

(22) Filed: Dec. 10, 2021

(65) Prior Publication Data

US 2022/0209876 A1 Jun. 30, 2022

Related U.S. Application Data

(60) Provisional application No. 63/124,015, filed on Dec. 10, 2020.

(51) Int. Cl.
*H04B 17/391* (2015.01)
*G01W 1/10* (2006.01)
*H04B 7/185* (2006.01)
*H04B 17/373* (2015.01)

(52) U.S. Cl.
CPC .......... *H04B 17/3913* (2015.01); *G01W 1/10* (2013.01); *H04B 7/1851* (2013.01); *H04B 17/373* (2015.01)

(58) Field of Classification Search
CPC ......................... H04B 17/3913; H04B 17/373; H04B 7/1851; G01W 1/10
See application file for complete search history.

(56) References Cited

U.S. PATENT DOCUMENTS

2014/0094113 A1* 4/2014 Kim .................. H04B 7/18519
455/12.1
2020/0065712 A1* 2/2020 Wang ..................... G06N 20/20

\* cited by examiner

*Primary Examiner* — Natasha W Cosme
(74) *Attorney, Agent, or Firm* — Potomac Technology Law, LLC

(57) ABSTRACT

An apparatus and method for predicting the impact of various weather conditions on signal quality in a satellite communication system. A first model is generated for predicting RF signal degradation, and trained with link quality metrics from selected terminals over a first time interval. A second model is generated for predicting RF signal degradation resulting from weather conditions, and trained with both the link quality metrics from the selected terminals and weather conditions over a second predetermined time interval. Real time link quality metrics are analyzed using the trained first model and the trained second model in order to identify changes in current RF signal quality. At least one recommendation is subsequently generated to indicate a cause for changes in the current RF signal quality.

20 Claims, 12 Drawing Sheets

WEATHER IMPACT MODELING OF SATELLITE BASED SERVICES

The present application claims priority to U.S. Provisional Patent Application No. 63/124,015 filed Dec. 10, 2020, and entitled "WEATHER IMPACT MODELING OF SATELLITE BASED SERVICES," the entire disclosure of which is incorporated herein by reference.

BACKGROUND INFORMATION

High-speed internet services are increasingly used for accessing different types of content. Consumers utilize such services to access content such as news, social media, videos, movies, music, etc. Consumers residing in rural areas are often unable to access high-speed internet services from traditional internet service providers (ISPs) such as telephone companies, cable companies, etc. This can occur, for example, due to a lack of infrastructure for delivering high-speed internet services.

Satellite networks can be used to provide to provide reliable high-speed internet services to a large number of customers, such as those in rural areas, who would otherwise have no connectivity. Satellite networks utilize internet protocol over satellite (IPoS) networks to provide high-speed internet services to such consumers. Being a long-distance RF communication link, IPoS networks are uniquely affected by weather events occurring at their ground station endpoints. This can present a challenging task for network operators who must determine how to counter network events causing degradation, outages etc. which may have weather or non-weather-related origins.

Satellite based network operators are required to do tedious data collection, processing, and analysis in order to determine whether a network event results from weather conditions impacting the Satellite's RF link prior to determining the steps required to recover the system from the degradation or fault conditions. Hence the insights into weather information at the subscriber locations, networks RF Gateway locations, and correlation with the network's RF transport metrics can enable the satellite internet service provider to respond quickly and appropriately to service outages and degradations.

BRIEF SUMMARY

An apparatus and method are disclosed for predicting the impact of various weather conditions on signal quality in a satellite communication system. According to an embodiment, a method comprises: generating a first model for predicting RF signal degradation in a satellite communication system; training the first model with link quality metrics from selected terminals over a first predetermined time interval; generating a second model for predicting RF signal degradation in the satellite communication system resulting from weather conditions; training the second model with both the link quality metrics from the selected terminals and weather conditions over a second predetermined time interval; analyzing real time link quality metrics using the trained first model and the trained second model; identifying changes in current RF signal quality, based on the analysis; and generating at least one recommendation indicative of a cause for the identified changes in current RF signal quality.

According to another embodiment, an apparatus comprises one or more processors configured to: generate a first model for predicting RF signal degradation in a satellite communication system; train the first model with link quality metrics from selected terminals over a first predetermined time interval; generate a second model for predicting RF signal degradation in the satellite communication system resulting from weather conditions; train the second model with both the link quality metrics from the selected terminals and weather conditions over a second predetermined time interval; analyze real time link quality metrics using the trained first model and the trained second model; identify changes in current RF signal quality, based on the analysis; and generate at least one recommendation indicative of a cause for the identified changes in current RF signal quality.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

A system and method for dynamically modeling the impact of weather events on a satellite network are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
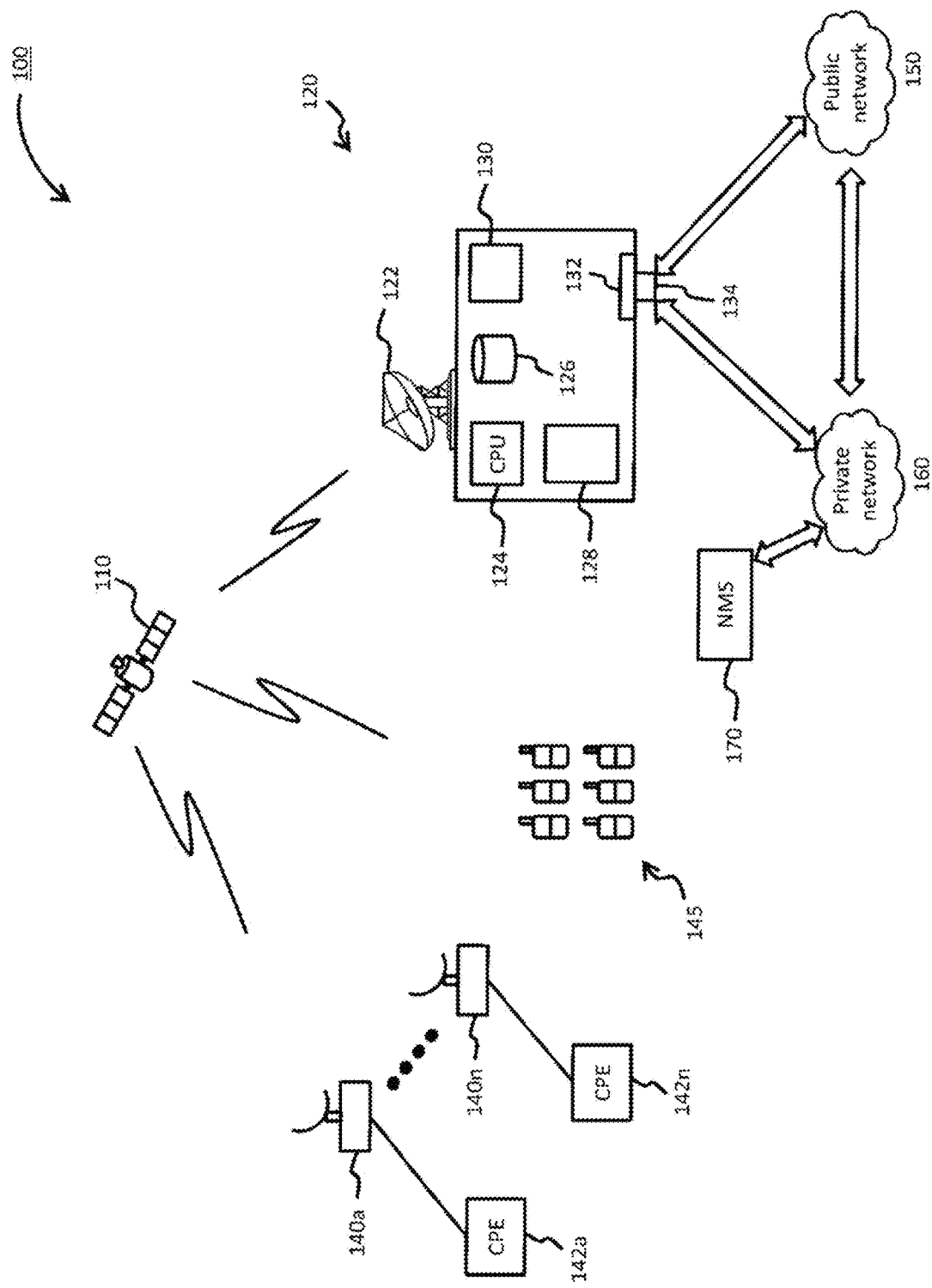
FIG. 1 is a diagram of a system capable of providing of voice and data services, according to at least one embodiment.

FIG. 1 illustrates a satellite communication system 100 capable of providing voice and data services. The satellite communication system 100 includes a satellite 110 that supports communications among a number of gateways 120 (only one shown) and multiple stationary satellite terminals 140a-140n. Each satellite terminal (or terminal) 140 can be configured for relaying traffic between its customer premise equipment (CPEs) 142a-142n (i.e., user equipment), a public network 150 such as the internet, and/or its private network 160. Depending on the specific embodiment, the customer premise equipment 142 can be a desktop computer, laptop, tablet, cell phone, etc. Customer premise equipment 142 can also be in the form of connected appliances that incorporate embedded circuitry for network communication can also be supported by the satellite terminal (or terminal) 140. Connected appliances can include, without limitation, televisions, home assistants, thermostats, refrigerators, ovens, etc. The network of such devices is commonly referred to as the internet of things (IoT).

According to an exemplary embodiment, the terminals 140 can be in the form of very small aperture terminals (VSATs) that are mounted on a structure, habitat, etc. Depending on the specific application, however, the terminal 140 can incorporate an antenna dish of different sizes (e.g., small, medium, large, etc.). The terminals 140 typically remain in the same location once mounted, unless otherwise removed from the mounting. According to various embodiments, the terminals 140 can be mounted on mobile platforms that facilitate transportation thereof from one location to another. Such mobile platforms can include, for example, cars, buses, boats, planes, etc. The terminals 140 can further be in the form of transportable terminals capable of being transported from one location to another. Such transportable terminals are operational only after arriving at a particular destination, and not while being transported.

As illustrated in FIG. 1, the satellite communication system 100 can also include a plurality of mobile terminals 145 that are capable of being transported to different locations by a user. In contrast to transportable terminals, the mobile terminals 145 remain operational while users travel from one location to another. The terms user terminal, satellite terminal, terminal may be used interchangeably herein to identify any of the foregoing types. The gateway 120 can be configured to route traffic from stationary, transportable, and mobile terminals (collectively terminals 140) across the public network 150 and private network 160 as appropriate. The gateway 120 can be further configured to route traffic from the public network 150 and private network 160 across the satellite link to the appropriate terminal 140. The terminal 140 then routes the traffic to the appropriate customer premise equipment (CPE) 142.

According to at least one embodiment, the gateway 120 can include various components, implemented in hardware, software, or a combination thereof, to facilitate communication between the terminals 140 and external networks 150, 160 via the satellite 110. According to an embodiment, the gateway 120 can include a radio frequency transceiver 122 (RFT), a processing unit 124 (or computer, CPU, etc.), and a data storage unit 126 (or storage unit). While generically illustrated, the processing unit 124 can encompass various configurations including, without limitations, a personal computer, laptop, server, etc. As used herein, a transceiver corresponds to any type of antenna unit used to transmit and receive signals, a transmitter, a receiver, etc. The RFT 122 is useable to transmit and receive signals within a communication system such as the satellite communication system 100 illustrated in FIG. 1. The data storage unit 126 can be used, for example, to store and provide access to information pertaining to various operations in the satellite communication system 100. Depending on the specific implementation, the data storage unit 126 (or storage unit) can be configured as a single drive, multiple drives, an array of drives configured to operate as a single drive, etc.

According to other embodiments, the gateway 120 can include multiple processing units 124 and multiple data storage units 126 in order to accommodate the needs of a particular system implementation. Although not illustrated in FIG. 1, the gateway 120 can also include one or more workstations 125 (e.g., computers, laptops, etc.) in place of, or in addition to, the one or more processing units 124. Various embodiments further provide for redundant paths for components of the gateway 120. The redundant paths can be associated with backup components capable of being seamlessly or quickly switched in the event of a failure or critical fault of the primary component.

According to the illustrated embodiment, the gateway 120 includes baseband components 128 which operate to process signals being transmitted to, and received from, the satellite 110. For example, the baseband components 128 can incorporate one or more modulator/demodulator units, system timing equipment, switching devices, etc. The modulator/demodulator units can be used to generate carriers that are transmitted into each spot beam and to process signals received from the terminals 140. The system timing equipment can be used to distribute timing information for synchronizing transmissions from the terminals 140.

According to an embodiment, a fault management unit 130 can be included in the gateway 120 to monitor activities and output one or more alerts in the event of a malfunction in any of the gateway components. The fault management unit 130 can include, for example, one or more sensors and interfaces that connect to different components of the gateway 120. The fault management unit 130 can also be configured to output alerts based on instructions received from a remotely located network management system 170 (NMS). The NMS 170 maintains, in part, information (configuration, processing, management, etc.) for the gateway 120, and all terminals 140 and beams supported by the gateway 120. The gateway 120 can further include a network interface 132, such as one or more edge routers, for establishing connections with a terrestrial connection point 134 from a service provider. Depending on the specific implementation, however, multiple terrestrial connection points 134 may be utilized.

Figure 2:
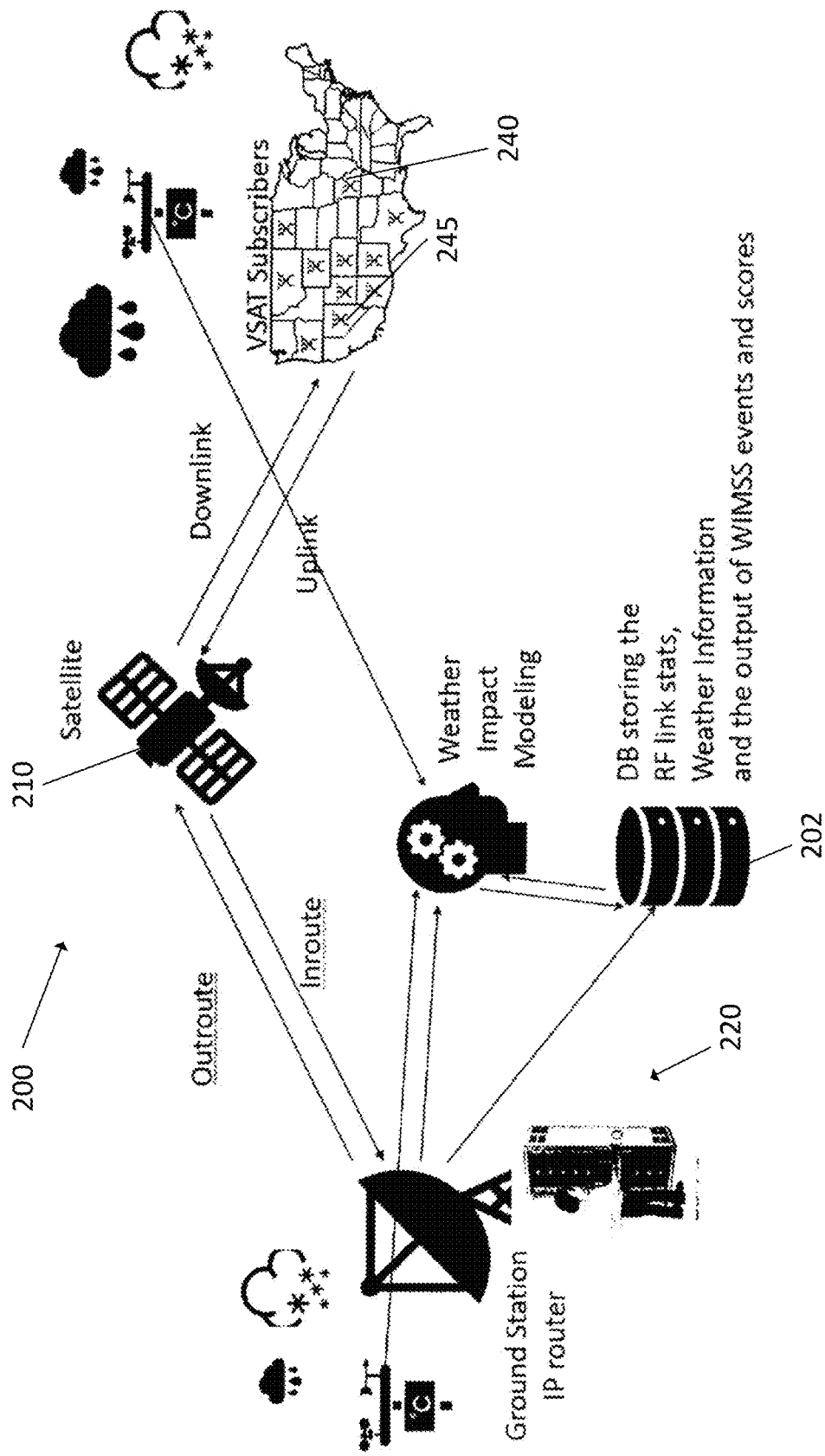
FIG. 2 is a diagram showing an architecture of a system incorporating weather impact modeling, according to one embodiment.

FIG. 2 illustrates an architecture for a satellite communication system 200 that incorporates weather impact modeling, in accordance with various embodiments. The system 200 includes subsystems and components for collecting weather information at predetermined locations that represent various locations of terminals 140 (e.g., terminals 240, 245) and gateways (e.g., gateway 220). The gateways and terminals can be in communication via a satellite 210, substantially as discussed in connection with FIG. 1. The weather information collected from the predetermined locations can be stored, manipulated, and/or utilized for weather impact modeling as discussed further herein. For example, weather information collected from the predetermined locations can be stored on, and accessed from, a database 202 operably coupled to the gateway 220. Depending on the specific implementation, the database 202 can be located within the gateway 220, or remotely located (e.g., within the NMS 170). The collected weather information can be used in combination with data related to historical signal quality of the satellite link to predict impact weather conditions may have on RF signal quality in the satellite communication system 200. Further, the weather information can be used to predict whether a degradation in RF signal quality is likely weather related, or, alternatively, if the degradation in signal quality is likely due to network infrastructure conditions, such as hardware failures or other circumstances.

According to one or more embodiments, a variety of data can be collected and analyzed in order to provide weather impact modeling features capable of providing recommendations associated with the impact of weather conditions on RF signal quality. For example, geographic location and information for each terminal can be collected and stored. Such geographical information can include, without limitation, a coverage footprint of one or more satellites upon which each terminal relies, a location of the terminal, a density of terminals in the vicinity of the terminal, and geographic information related to the location of the terminal, such as terrain, natural or artificial obstructions, vegetation, and other geographical conditions that may impact RF signal quality and satellite transmissions.

In addition to location and geographical information, information related to RF signal quality between the gateway 220 and the satellite 210, as well as between each terminal and the satellite 210, can be collected and stored. The RF signal quality can be quantified by one or more link quality metrics or other factors including, but not limited to, signal quality factor (SQF) of outroute transmissions (i.e., data transmissions from the gateway 220 to satellite 210), modulation and coding type (ModCod, SymCod) for outroute transmissions, signal to noise ratio (e.g., energy per symbol to noise power spectral density levels (EsNo)), modulation and coding type for inroute transmissions, signal power at inroute transmission, stream error rate, etc. The RF signal quality information can be collected over a predetermined period of time, such as days, weeks, months, one year, more than one year, etc. According to various embodiments, the RF signal quality information is collected over a period of less than one year. In one specific implementation, the RF signal quality information is collected over a period of three months.

Additionally, information related to weather conditions over a predetermined time interval can be collected and stored. The weather information can include, without limitation, weather conditions such as temperature, barometric pressure, relative humidity, wind speed and direction, precipitation type, precipitation amount, cloud cover, visibility, etc. In some embodiments, weather conditions collected may be assigned a category rating. For example, weather categories can include conditions such as rain, fog, snow, wind, high humidity, or other conditions, and can include discrete weather events such as storms, tornados, hurricanes, derechos, or other weather events.

In addition to the weather category assignment, the recorded weather conditions and/or category can be assigned a severity rating. The severity rating can be based on a relative numerical scale, such as a rating of 0-5, 0-10, 0-20, etc. The rating can be from least severe (0) to most severe (maximum number on scale, e.g., 5, 10, 20, etc.). The number of steps in the scale can be chosen to provide a desired level of resolution in assigning severity, e.g., to provide relatively greater precision in the weather data. In one embodiment, the scale is from 0-20, with 0 being minimum severity and 20 being maximum severity. The scaling can be performed following the collection of weather data and can be scaled to the maximum and minimum recorded conditions or events during the time of data collection. Alternatively, the scaling can be based on historical record extremes for the location at which the weather conditions are recorded, based on a certain number of standard deviations from an average, or any other approach for assigning a scale to the severity.

In some embodiments, the weather information can be collected for a year or more to ensure that weather impacts related to each season are accounted for in the collected weather information. Additionally, multiple years of weather information can be recorded, and the resulting data averaged across years. Weather information for less than a year can also be recorded, and the results extrapolated. The weather information can be collected from sources such as ground weather stations, radar weather information, and may be obtained from private weather stations, commercial weather information services, or another other source.

Using the recorded weather information in conjunction with the location and geographical information and the signal quality information, models of expected signal quality can be generated to assist an operator in determining the cause of a degraded signal condition. For example, the models can inform the operator that the degraded signal location being experienced by certain terminals is likely due to weather or likely due to other factors, such as network infrastructure conditions (e.g., failures in system hardware and/or software).

Figure 3:
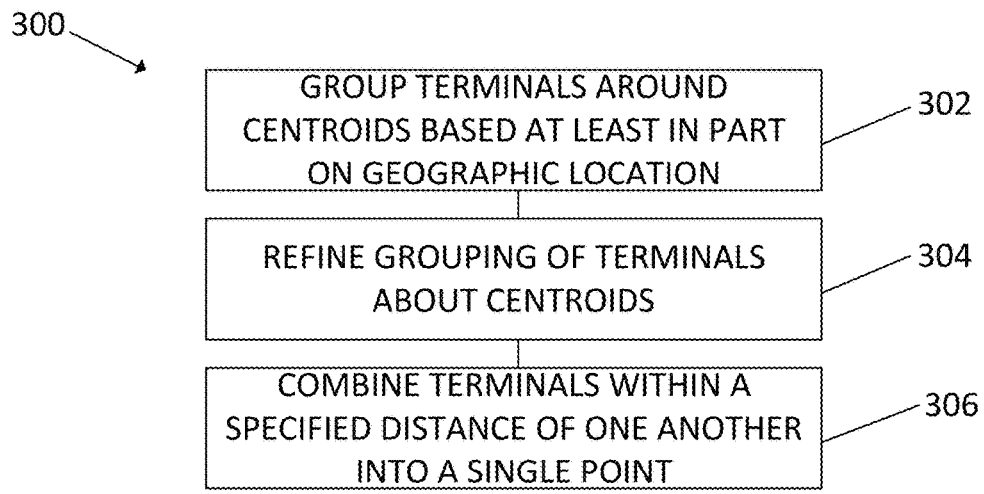
FIG. 3 is a flowchart illustrating a workflow for organization of terminals, according to one embodiment.

FIG. 3 is a flowchart 300 illustrating the organization of terminals across a given area into groups. As can be appreciated, a large number of terminals can be supported over the coverage area of the satellite communication system, thereby resulting in a likelihood of gradual differences in weather conditions from location to location. According to the illustrated embodiment, terminals across a wide geographical area can be grouped around centroid locations for which weather information is collected. At 302, terminals are grouped based, at least in part, on geographic location. For example, in an embodiment, a statistical algorithm can be applied to the terminals across a given area to group the terminals according to location. In one example, the terminals are grouped around centroids determined by a vector quantization, such as a k-means clustering algorithm. Further analyses can be applied to confirm or further refine the grouping of terminals about chosen centroids. For example, at 304, for centroids determined at 302, silhouette values are calculated to evaluate the appropriateness of the chosen centroids. Based on the silhouette values calculated at 304, the centroids can be recalculated to improve the silhouette values, or the centroids can be accepted as initially calculated. While k-means clustering and silhouette values are presented herein as possible algorithms for creating clusters of terminals about centroids, other analyses, algorithms, and approaches can be used to form geographical clusters as would be appreciated by persons having ordinary skill in the art. Furthermore, the clustering of terminals can consider locations for which weather information is available, such as locations of weather stations. For example, the clustering can be performed such that multiple terminals can be organized around weather station locations.

Further refinements and alterations to the clustered terminals can be made to facilitate generation and manipulation of models used for weather impact modeling. For example, at 306, any terminals in a group that are within a specified distance of one another can be combined into a single point.

In some embodiments, the specified distance can be, for example, less than one mile, more than one mile (e.g., five miles, ten miles, etc.) In the exemplary embodiment of FIG. 3, terminals separated by less than ten miles can be combined into a single point. Further, in situations in which the area over which the terminals are clustered is served by multiple networks operated by the satellite operator (e.g., two satellite networks under ownership and control of the same entity), terminals within a specified distance of one another can be combined into one point, and that point can be shared by both networks.

Figure 4:
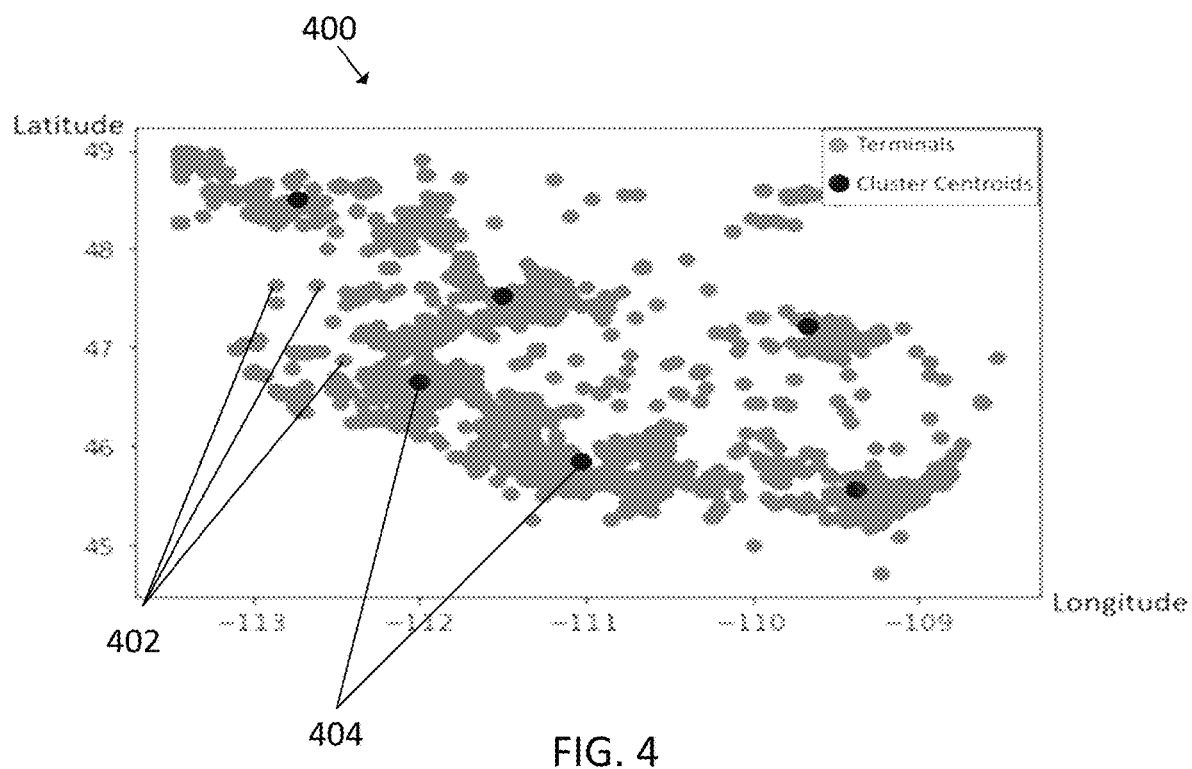
FIG. 4 is a chart showing an exemplary grouping of terminals according to one embodiment.

FIG. 4 is a chart 400 showing an exemplary grouping of terminals 402 about centroids 404. The centroids can be determined, for example, by the process discussed above in connection with FIG. 3. As shown in FIG. 4, the terminals 402 may be spread across an area defined by a range of latitudes (y axis) and longitudes (x axis). The terminals 402 may be distributed evenly or unevenly across the area. For example, as shown in FIG. 4, the terminals 402 may have an uneven distribution across the area due to variations in population density (e.g., rural, suburban, urban areas) and geography (e.g., geographical features such as lakes, rivers, mountain ranges, and other features that affect development and resulting population density. Centroids 404 are determined based on the locations of terminals 402 as discussed in connection with FIG. 3, e.g., via any appropriate algorithm or analysis method.

Once the data regarding RF signal quality, weather conditions, and cluster centroid locations are collected, the collected data can be further manipulated and refined. For example, one or more statistical models or mathematical algorithms may be used to remove any data points that represent outliers or inaccurate inputs that may undesirably skew the data set. Using the completed and refined data set, weather impact modeling is performed to generate and train different models that can be used to generate recommendations pertaining to a cause for changes in RF signal quality.

Figure 5:
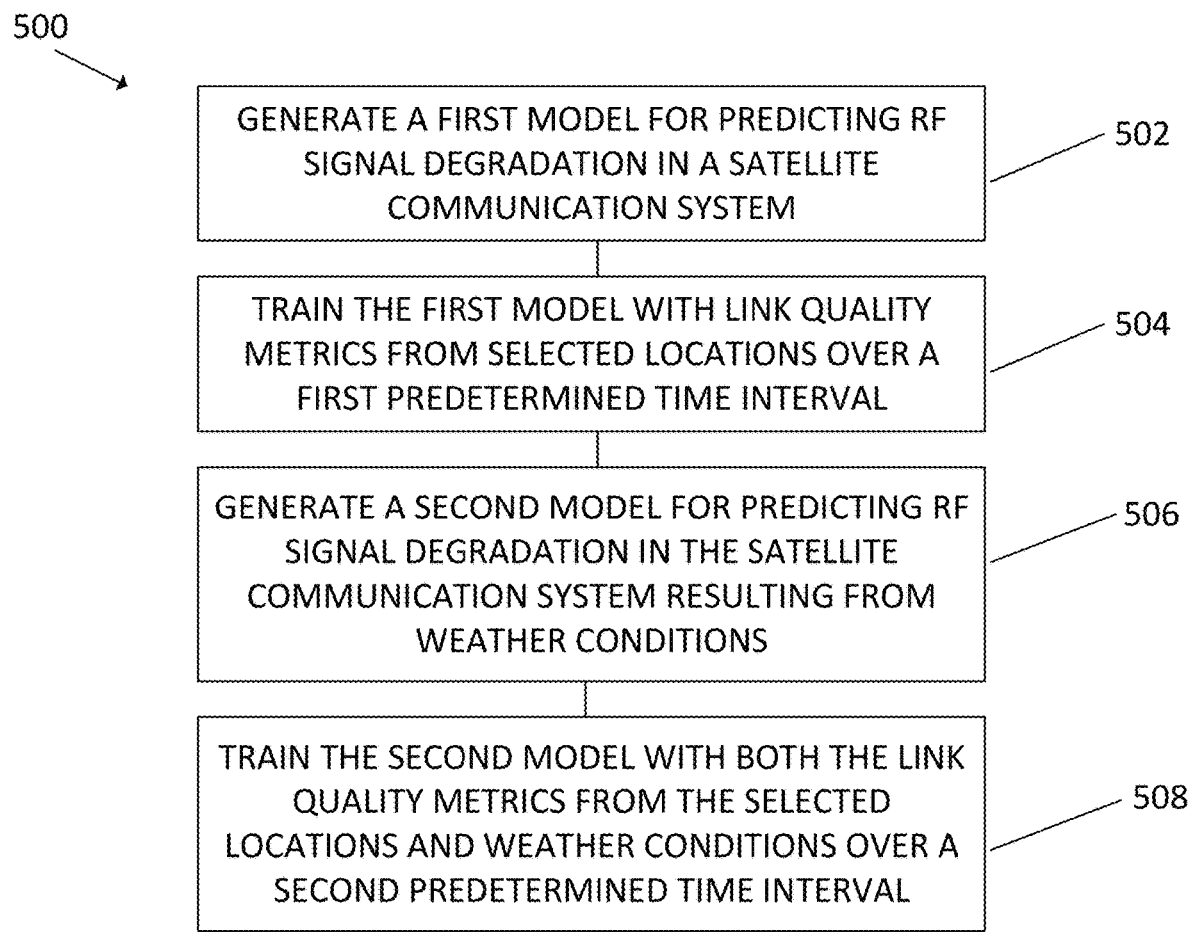
FIG. 5 is a flowchart illustrating a process for weather impact modeling according to one embodiment.

FIG. 5 is a flowchart 500 illustrating a process for performing weather impact modeling. At 502, based on the refined data, a first model is generated to predict RF signal degradation values in the satellite communication system. At 504, the first model is trained based on the data collected regarding RF signal degradation values for each of the centroid locations. The first model can be trained based on the RF signal quality data collected over the first time period, e.g., three months, as discussed above in connection with FIG. 2. Thus, the first model predicts RF signal degradation values without regard to weather conditions, i.e., the first model is based solely on the historical RF signal quality over the first time interval. The first model can provide a prediction for RF signal quality for each centroid location identified as discussed in connection with FIGS. 3 and 4.

According to one or more embodiments, the first model can be created and/or trained using one or more machine-learning algorithms. Such machine learning algorithms can include, for example, Random Forest, K Nearest Neighbors, Support Vector Machine, Artificial Neural Network, Ensemble Voting Classifier, and long short-term memory (LSTM). The algorithms are fine tuned to produce predictions for RF signal degradation based on the collected RF signal data. Random Forests (RF) are machine learning models for classification and regression by constructing a forest of decision trees. Each tree takes different features and different bunches of row indexes. Primary parameters used to tune the random forest model for maximum accuracy include the number of trees and the depth of the individual tree. K nearest neighbors (KNN) is a non-parametric method used for classification and regression. The prediction result is classified by a vote of its neighbors. The primary parameter to tune is the k number. Support vector machine (SVM) is a discriminative classifier defined by a separating hyperplane. Based on a kernel function, a non-linear classification can be achieved. The primary parameters to tune include gamma (δ) and C, which balance the underfitting and overfitting of the models. Artificial neural networks are based on a collection of connected units or nodes called neurons. The parameters tuned include number of hidden layers and corresponding number of neurons in each layer. Voting classifier is an ensemble learning based on the three models including random forest, K nearest neighbors, and support vector machine. Long short-term memory is an artificial recurrent neural network (RNN) architecture that uses feedback connections to process sequences of data.

At 506, a second model is generated using recorded RF signal quality and weather conditions for each of the centroids identified as discussed in connection with FIGS. 3 and 4. The second model can predict expected RF signal quality conditions, such as RF signal quality degradation, associated with particular weather conditions, by correlating the weather conditions with the recorded RF signal quality degradation. For example, the second model can be based on weather condition data and RF signal quality conditions collected from each centroid over a time period of, e.g., a year. At 508, the second model is trained with RF signal quality conditions and weather conditions information over a second predetermined time, such as, for example, one year as discussed above. Time periods of less than or greater than one year are considered within the scope of the disclosure, as discussed above. Similar to the first model, the second model can be created and/or trained using one or more machine-learning algorithms.

Using the historical RF signal conditions and their correlation with historical weather conditions, the second model can provide an association between RF signal conditions and weather conditions that can be used predictively to evaluate whether real-time RF signal quality conditions (e.g., RF signal degradation) is likely due to weather or other factors. That is, the second model is generated based on a collection of data that represents various weather conditions, and RF signal conditions associated with those weather conditions, collected over the course of, for example one year. Thus, real-time RF signal conditions can be compared with real-time weather conditions, and based on the historical data, a prediction can be made regarding whether current RF signal conditions are within an expected range for the prevailing weather conditions, or if the RF signal conditions are indicative of some anomaly not attributable to the weather conditions. For example, comparisons of actual and expected RF signal quality can be made as discussed in further detail in connection with FIGS. 6-9.

In some exemplary embodiments, one or more machine learning algorithms can be used to associate the RF signal quality with the weather conditions over the predetermined time interval for which the data collection for the second model was performed. For example, one or more neural network models can be used for a time series analysis by correlating RF signal quality metrics with weather information. Various other machine learning algorithms can be implemented as would be familiar to those having ordinary skill in the art, and can include, for example, neural networks, random forest, K nearest neighbors, support vector machine, ensemble voting classifier, etc.

Figure 6:
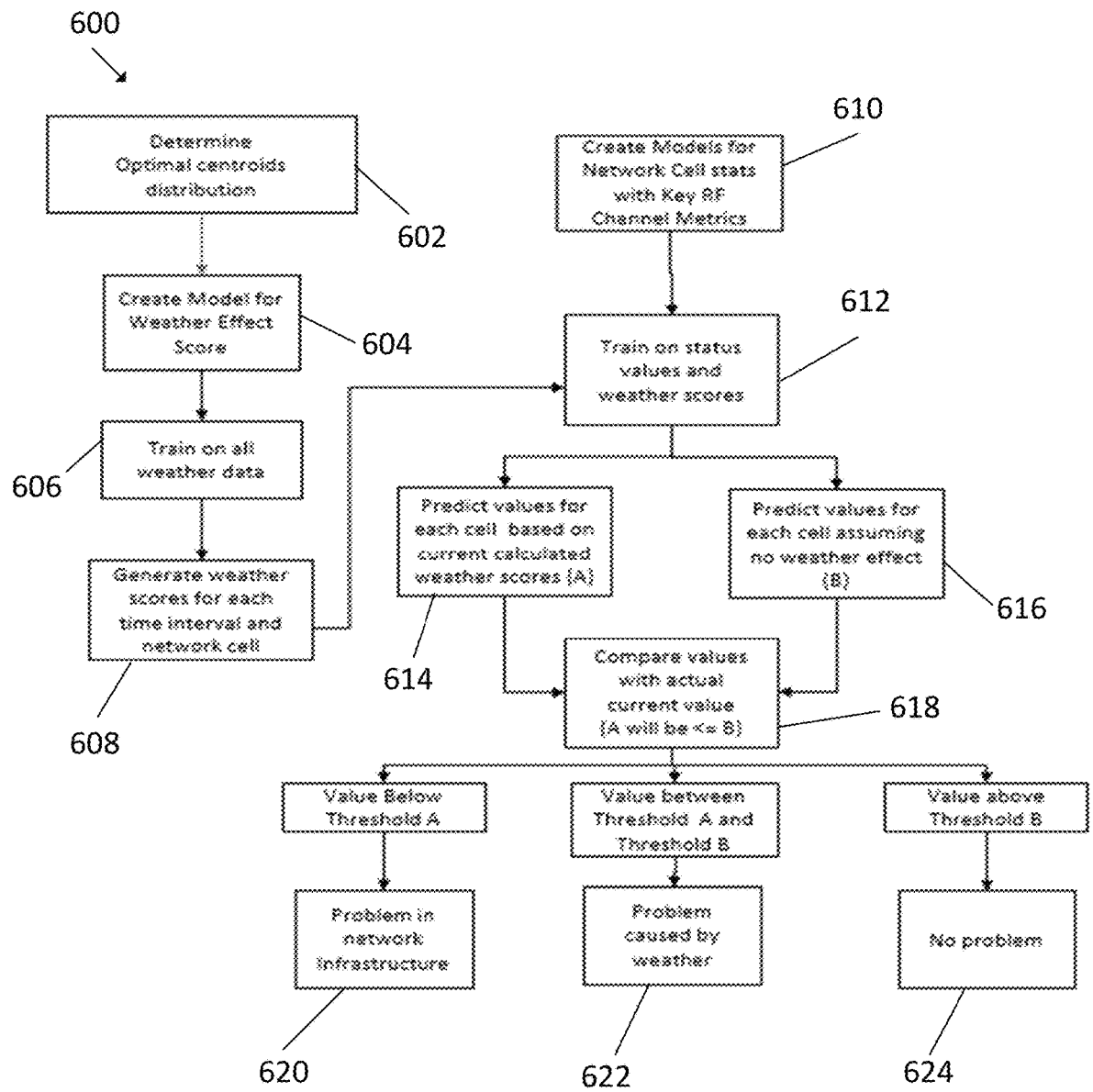
FIG. 6 is a flowchart illustrating another process for weather impact modeling according to one embodiment.

Referring now to FIG. 6, a flowchart 600 illustrating a process for weather impact modeling, according to an embodiment. At 602, centroid locations are determined for the terminals. This can be done, for example, using the process shown in FIG. 3. At 604, a weather impact model is created to correlate weather conditions with expected RF signal quality conditions for each of the locations determined at 602. At 606, the weather impact model is trained using the weather data and signal quality data collected as discussed in connection with FIG. 5. The weather impact model can be created using, for example, machine learning algorithms as discussed above.

Once the weather impact model is generated and trained at 604 and 606, weather scores for current conditions are assigned at 608 for each centroid location. As previously discussed in connection with FIG. 2, the weather scores can be based on a predetermined numerical scale to indicate a relative severity of the weather conditions, such as from 0-20, with 0 being the lowest severity. At 610, an RF signal quality model is generated. The model can be created based on data corresponding to network call statistics, and various metrics associated with channels used by the terminals. According to one or more embodiments, the RF signal quality model without consideration for any weather conditions.

At 612, the weather impact model and the RF signal quality model are used to train a predictive analysis model. At 614, using the weather impact model generated at 604 and 606, an expected RF signal quality metric is predicted based on current weather conditions, including, e.g., the weather impact score. The expected RF signal quality metric based on the weather impact model can be assigned a label "A." At 616, the RF signal quality model is used to generate a predicted value of RF signal quality in the absence of anomalous weather conditions. The predicted value of the RF signal quality without regard for weather conditions can be assigned a label "B." According to one or more embodiments, each of the predicted values, A and B, can take the form of an expected range of values with an upper bound and a lower bound. At 618, the values or ranges of A and B are compared with real time link quality metrics, such as a current RF signal quality measurement. If the current value is below the value A (i.e., the value of RF signal quality predicted based on the current weather conditions), a problem in network infrastructure is indicated at 620. If the current RF signal quality falls between values A and B, the problem is indicated to be weather-related at 622. If the current RF signal quality is above the value B, i.e., the expected value of RF signal quality in the absence of weather-related impacts, then no problem is indicated at 624. In some embodiments, the weather impact model generated and at 604, 606 and the RF signal quality model generated at 610 can each include upper and lower bounds between which signal quality values are expected to fall.

Figure 7:
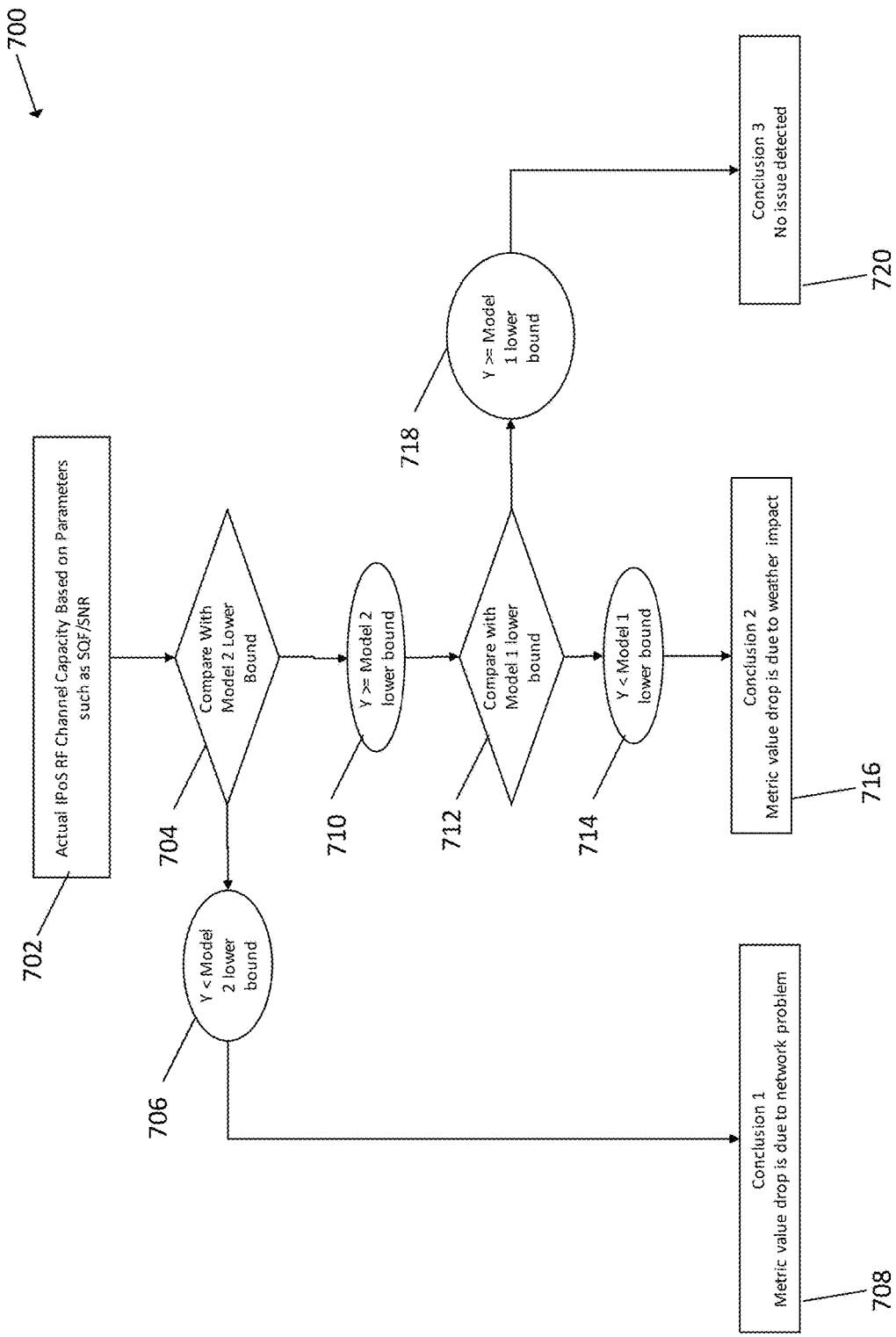
FIG. 7 is a flowchart illustrating another process 700 for weather impact modeling according to one embodiment.

FIG. 7 is a flowchart illustrating a process 700 for weather impact modeling according to an embodiment. According to the illustrated embodiment, each model includes upper and lower bounds. At 702, the actual RF signal quality metrics (such as, for example SQF and/or SNR) are collected. At 704, the actual RF signal quality metrics are compared to the lower bound of the weather impact model. If the actual RF signal quality is determined to be below the lower bound of the weather impact model at 706, the signal quality drop is indicated as being due to network issues, such as infrastructure hardware and/or software failures. This is indicated at 708 as "Conclusion 1". If the actual RF signal quality is determined to be equal to or greater than the weather impact model lower bound at 710, control passes to 712. The actual RF signal quality is compared to the RF signal quality model (i.e., expected values in the absence of weather-related anomalies) at 712. If, at 714, the actual RF signal quality is determined to be lower than the RF signal quality model lower bound, the drop in RF signal quality is indicated as being due to weather impact. This is indicated at 716 as "Conclusion 2". If the actual RF signal quality is determined to be greater than or equal to the RF signal quality model lower bound at 718, then it is concluded that no issue can be detected. This is indicated at 720 as "Conclusion 3".

Figure 8:
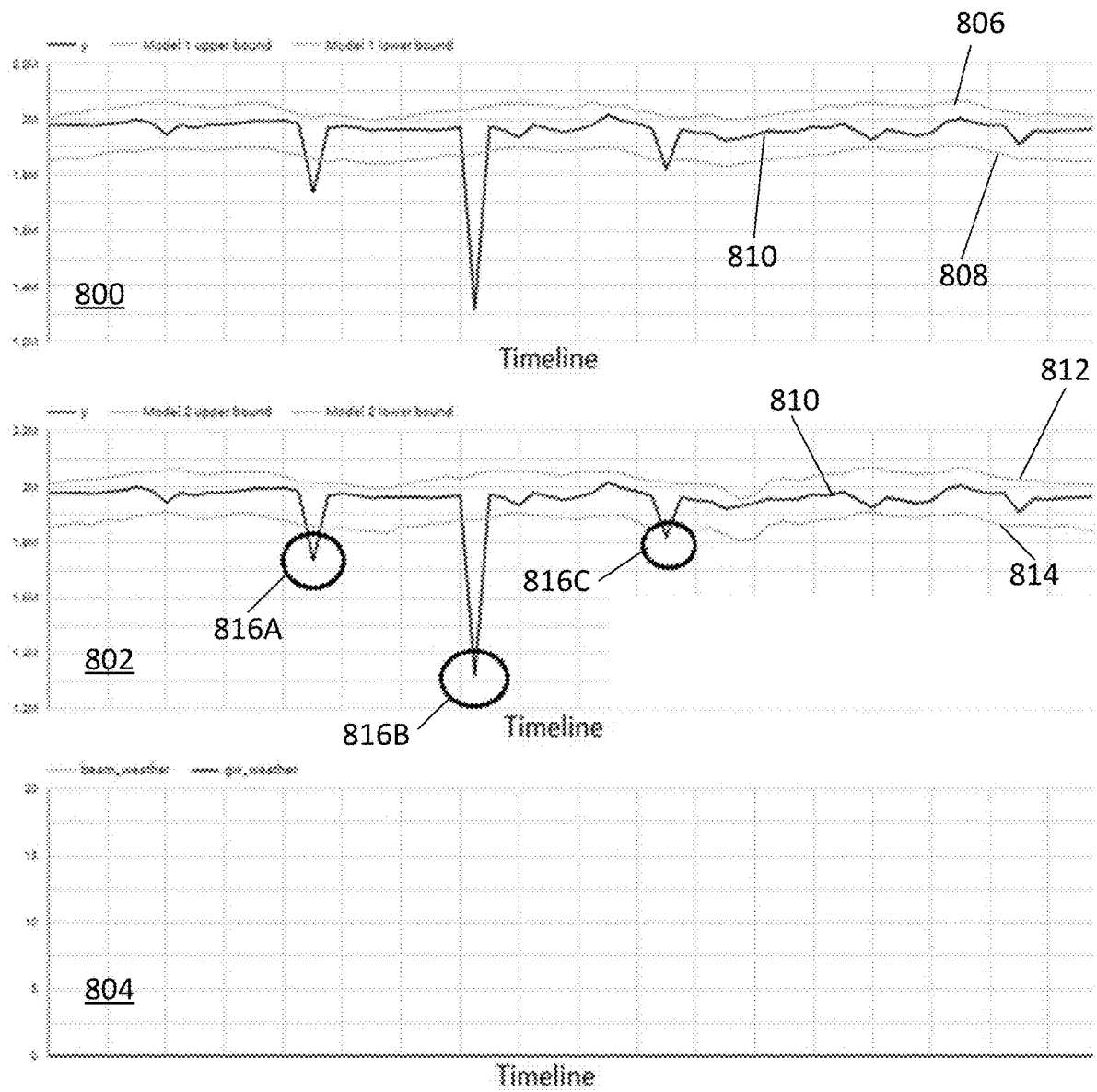
FIG. 8 shows various graphs illustrating the results of applying disclosed weather impact modeling features according to one embodiment.
Figure 9:
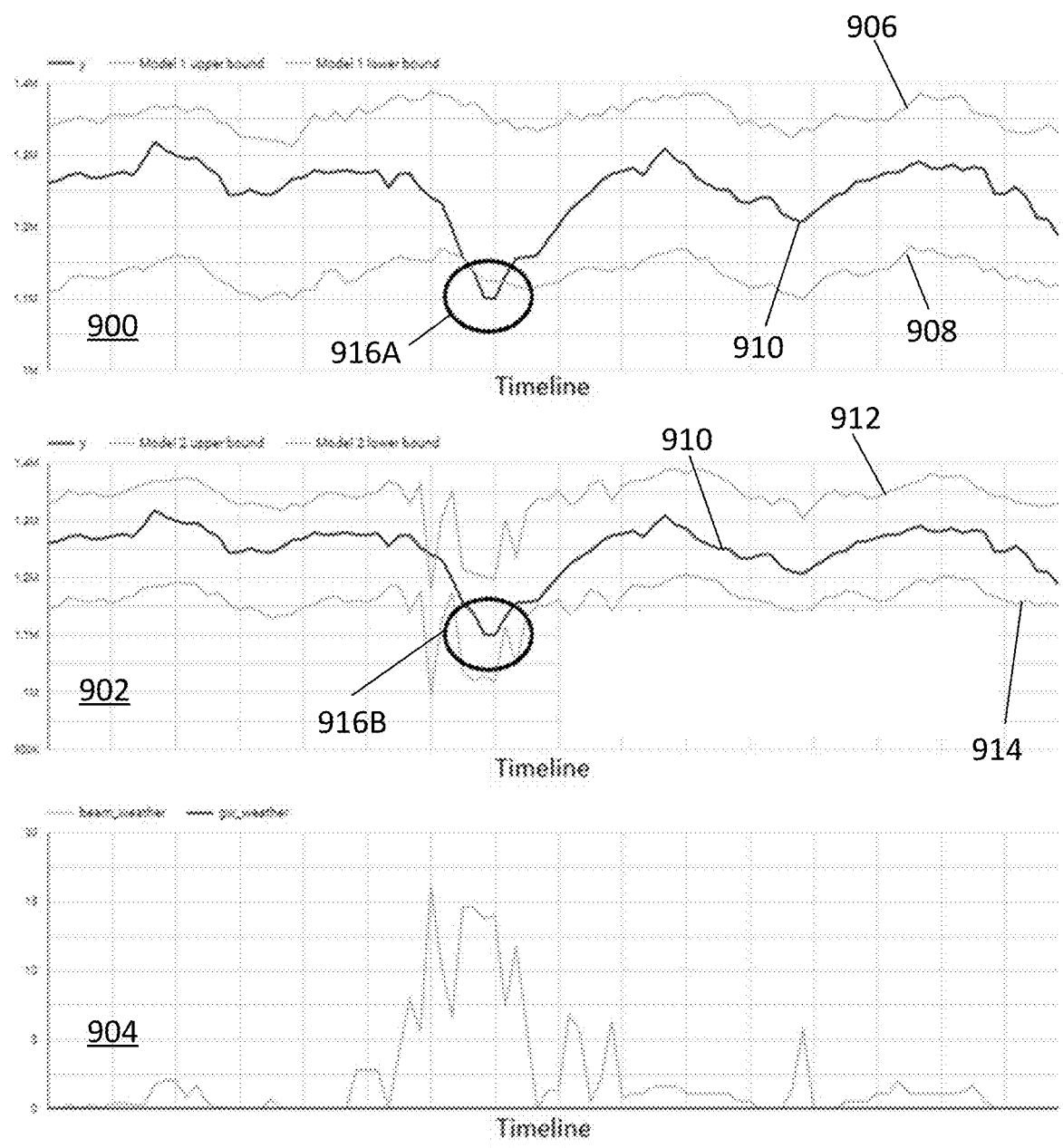
FIG. 9 shows various graphs illustrating the results of applying disclosed weather impact modeling features according to another embodiment.
Figure 10:
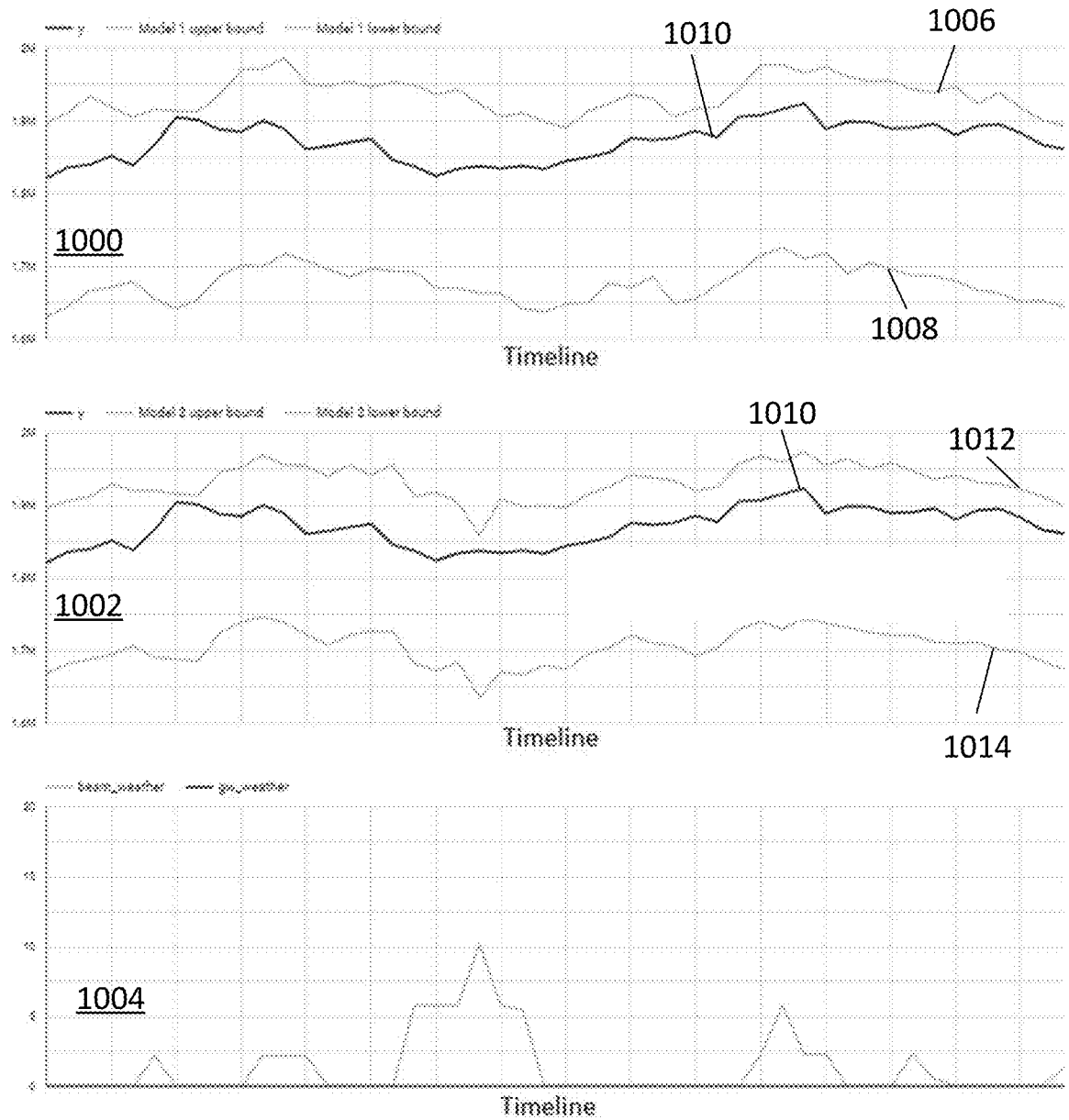
FIG. 10 shows various graphs illustrating the results of applying disclosed weather impact modeling features according to another embodiment.

FIGS. 8-10 provide various example timeline illustrating the results of applying various disclosed features. Referring now to FIG. 8, graph 800 shows a timeline with the expected RF signal quality without weather impact ("Model 1") upper bound 806 and Model 1 lower bound 808. The actual RF signal quality is indicated by 810. Referring to graph 802, the same timeline is shown with the expected RF signal quality with weather impact modeling ("Model 2") upper bound 812 and lower bound 814. Graph 804 shows the weather impact score for the analyzed location, e.g., a centroid location. In the embodiment of FIG. 8, no weather impact score above 0 is reflected over the timeline, so no weather impact score appears on graph 804. As indicated at locations 816A, 816B, and 816C, the actual RF signal quality 810 drops below the Model 2 lower bound, indicating network conditions. More particularly, because the actual RF signal quality 810 falls below that which is expected considering weather impacts (i.e., the Model 2 expected values), the drops in RF signal quality at 816A, 816B, and 816C are attributable to network infrastructure issues.

Referring to FIG. 9, another timeline is shown. Graph 900 shows the timeline with Model 1 upper and lower bounds 906 and 908, respectively. Graph 902 shows the timeline with Model 2 upper and lower bounds 912 and 914, respectively. Graph 904 shows the timeline with a weather impact score ranging from 0 to above 15 out of a possible 20. As shown in Graph 900, an actual RF signal quality 910 drops below the Model 1 lower bound at location 916A. Thus, the RF signal quality is below that which would be expected in the absence of anomalous weather events. Referring now to graph 902, the actual RF signal quality 910 falls within the range predicted by Model 2, i.e., the range to be expected given the weather impact scores shown in graph 906, even at the location 916B corresponding to 916A in graph 900. Thus, the drop in RF signal quality reflected at location 916A is attributable to weather conditions, as opposed to network infrastructure issues.

Referring now to FIG. 10, another timeline is shown. Graph 1000 shows the timeline with Model 1 upper and lower bounds 1006 and 1008, respectively. Graph 1002 shows the timeline with Model 2 upper and lower bounds 1012 and 1014, respectively. Graph 1004 shows the timeline with a weather impact score ranging from 0 to 10 out of a possible 20. As shown in graphs 1000 and 1002, an actual RF signal quality 1010 falls within the range predicted by both Model 1 and Model 2, and thus no issue is detected.

Information regarding current RF signal quality conditions, and the likelihood of low RF signal quality conditions being due to weather conditions as opposed to network infrastructure issues can be relayed to operators of the satellite communication system. Such information can assist operators in making operational decisions such as identifying infrastructure problems for which a repair must be made, choosing modulation and coding schemes to mitigate poor RF signal quality conditions, etc. Additionally, the information can be used to assist operators in responding to customer calls regarding service interruptions.

Figure 11:
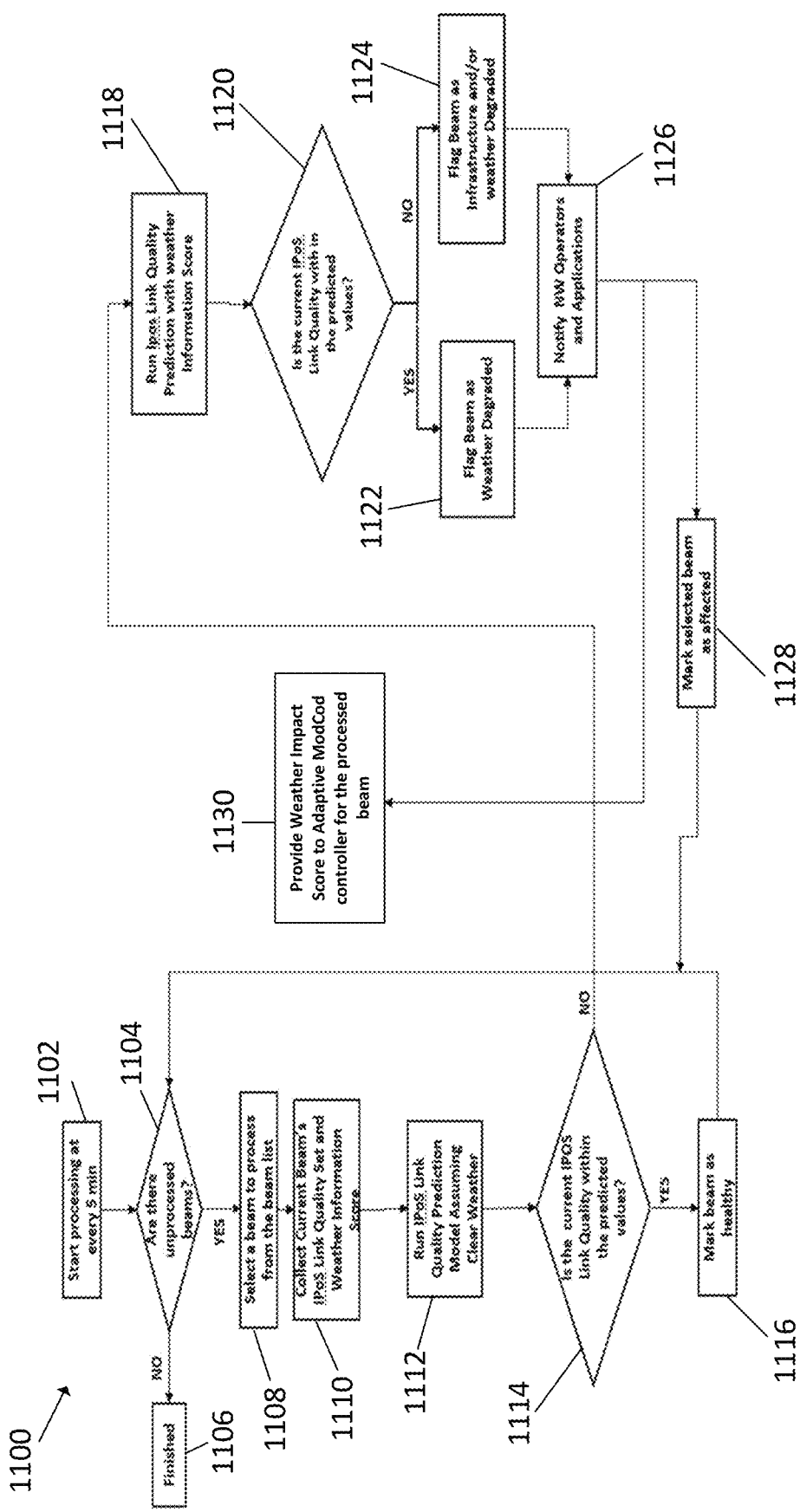
FIG. 11 is a flowchart illustrating a process for weather impact modeling according to another embodiment.

FIG. 11 is a flowchart 1100 illustrating a process for weather impact modeling according to another embodiment. At 1102, the processing routine is started. In some embodiments, the processing routine may be repeated at regular intervals, such as every minute, every hour, every day, etc. According to the embodiment illustrated in FIG. 11, the processing routine is repeated every 5 minutes. The repeat time can be chosen to provide information recent enough to address changing weather conditions, but not so frequent as to require an excessive amount of computing power. At 1104, it is determined whether there are beams that have not been processed. If there are no unprocessed beams, the routine is finished at 1106. As previously discussed, the routine is repeated in accordance with predetermined time intervals. Thus, even though the process finishes at 1106, it will be repeated at the next time interval. If there are unprocessed beam, the routine proceeds to 1108, where the next beam of a plurality of beams is selected for processing. According to at least one embodiment, the beams can be organized in a table or list, and sequentially processed. At 1110, the RF signal quality and weather impact models for the selected beam are collected. A weather information score is also created. At 1112, link quality metrics are predicted for the selected beam in the absence of weather-based signal degradation. At 1114, current link quality for the selected beam is compared to the predicted values (or metrics). According to the illustrated embodiment, a predetermined range of predicted values can be used for the comparison. If the current link quality is within the range predicted, the beam is designated as healthy at 1116. The routine subsequently returns to 1104. If the current RF signal quality is determined to be outside of the range predicted values, the routine proceeds to 1118. Link quality metrics are predicted for the selected beam using the weather impact model and a current weather score for the beam.

At 1120, the current link quality (or RF signal quality) is compared to the predicted values. If the current RF signal quality falls within the range of predicted values, the beam is designated as weather degraded at 1122. If the current RF signal quality falls outside the range predicted by the weather impact model, then at 1124, the beam is designated as potentially degraded by infrastructure problems (e.g., hardware/software faults) in addition to weather. Regardless of the results, the relevant system operators are notified at 1126. At 1128, the beam is marked as affected by weather conditions, infrastructure problems, or both. Control then returns to 1104 so that the next beam can be processed. At 1130, the weather impact score determined at 1118 is provided to a modulation and coding controller. Based on factors such as the category and severity of weather conditions, the modulation and coding scheme in use for the processed beam can be altered, e.g., to mitigate RF signal quality issues. For example, a more robust modulation and coding scheme can be adopted to compensate for signal degradation. In some embodiments, one or more recommendations can be provided to the operators regarding the expected cause of the RF signal degradation conditions, such as whether the RF signal degradation is likely due to weather conditions or due to network infrastructure conditions, one or more recommendations regarding a possible approach to mitigate the RF signal degradation, or other recommendations.

According to various embodiments, the system can assist IPoS network operators in instantly determining the correlation and degree of effect weather events have on network events. Network operators can utilize this information, at least in part, to improve the network recovery response times and enhance the quality of service (QoS) to the customers. The insights gained from weather patterns causing network events can also help to predict and plan for future network degradations or outages. For example, such information can be used for enabling the RF antenna's geo diversity system to be available to back up possible predicted outages at certain locations. Network operators can utilize information and recommendations from the system to make decisions regarding steps that should be taken to recover from network degradation/outage events. In addition, the system can facilitate alerts and notifications to the NMS (or other data center) on currently affected gateways, currently affecting weather, and likely upcoming effects of weather events covering the network area. By categorizing network degradation conditions, such as RF signal quality degradations, according to weather-related and non-weather related causes, network operators can more efficiently address correctable problems rather than using resources to investigate and analyze uncorrectable transient errors due to weather conditions. Further, more accurate information can be relayed to customers regarding outages and degradations, including likely causes and information regarding how long service issues may persist.

Features of the disclosed embodiments can provide insight to network operators regarding weather patterns causing network events, and assistance to develop predictions on network degradations or outages. For example, upon detecting certain predicted weather conditions, network operators can take preemptive steps to address projected hardware/software failures. Network operators can also transmit alert messages that can be displayed on customer devices (e.g., CPEs) to provide warnings of impending or projected system outage. Furthermore, the system can provide information which predicts the weather impact on current satellite channel conditions to enhance the adaptive Outroute modulation control system to improve the transport robustness during weather events that can affect Ka band RF transport channels. The system can also provide recommendations on the minimal set of geo coordinates at the optimal geographic locations for collecting the weather information. The recommendation can be based, for example, on user locations, user density, user service plans, etc.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Furthermore, various features can be implemented using algorithms illustrated in the form of flowcharts and accompanying descriptions. Some or all steps associated with such flowcharts can be performed in a sequence independent manner, unless otherwise indicated. Those skilled in the art will also understand that features described in connection with one Figure can be combined with features described in connection with another Figure. Such descriptions are only omitted for purposes of avoiding repetitive description of every possible combination of features that can result from the disclosure.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 12:
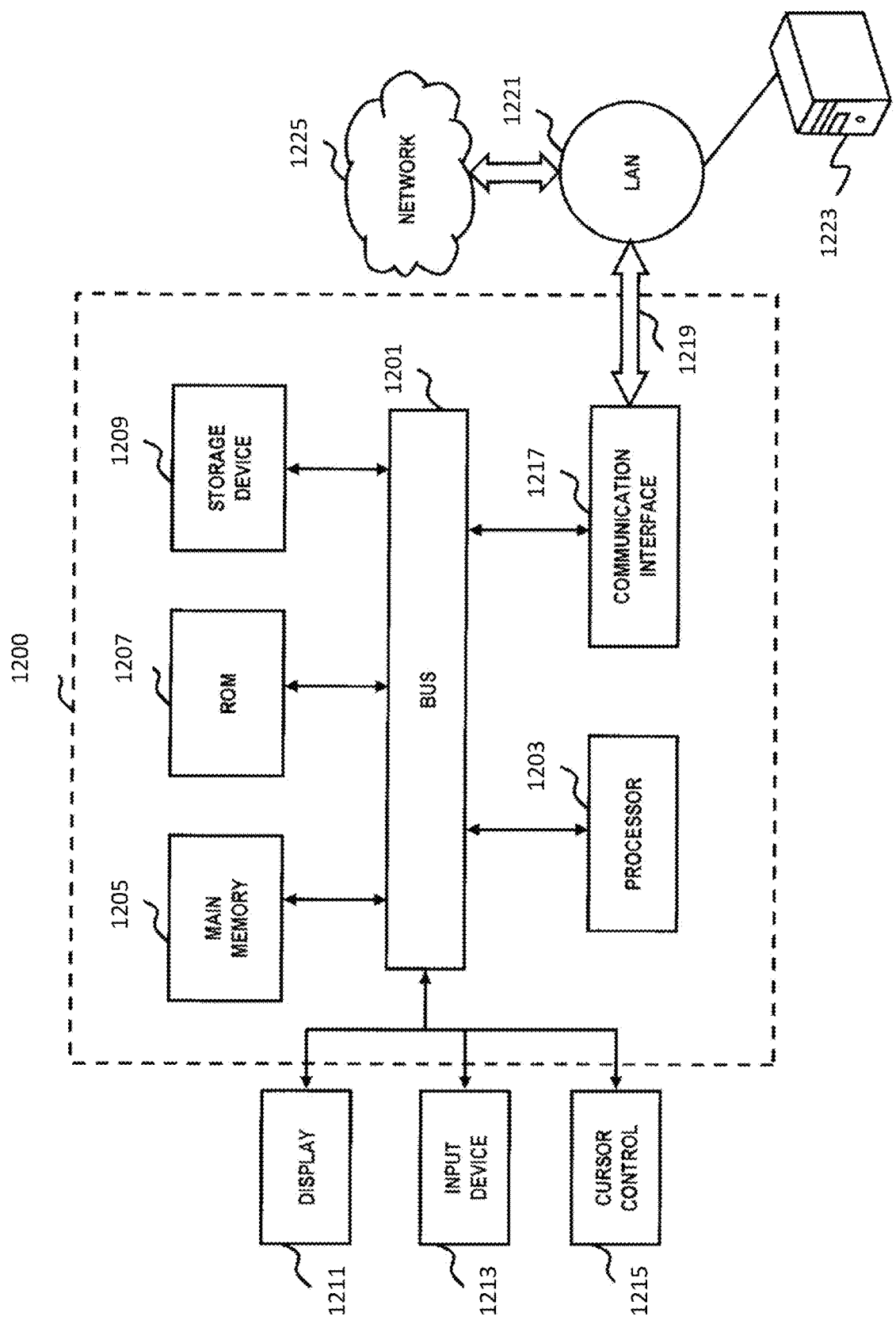
FIG. 12 is a diagram of a computer system that can be used to implement various exemplary features and embodiments.

FIG. 12 is a diagram of a computer system that can be used to implement features of various embodiments. The computer system 1200 includes a bus 1201 or other communication mechanism for communicating information and a processor 1203 coupled to the bus 1201 for processing information. The computer system 1200 also includes main memory 1205, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 1201 for storing information and instructions to be executed by the processor 1203. Main memory 1205 can also be used for storing temporary variables or other intermediate information during execution of instructions by the processor 1203. The computer system 1200 may further include a read only memory (ROM) 1207 or other static storage device coupled to the bus 1201 for storing static information and instructions for the processor 1203. A storage device 1209, such as a magnetic disk or optical disk, is coupled to the bus 1201 for persistently storing information and instructions.

The computer system 1200 may be coupled via the bus 1201 to a display 1211, such as a light emitting diode (LED) or other flat panel displays, for displaying information to a computer user. An input device 1213, such as a keyboard including alphanumeric and other keys, is coupled to the bus 1201 for communicating information and command selections to the processor 1203. Another type of user input device is a cursor control 1215, such as a mouse, a trackball, or cursor direction keys, for communicating direction information and command selections to the processor 1203 and for controlling cursor movement on the display 1211. Additionally, the display 1211 can be touch enabled (i.e., capacitive or resistive) in order facilitate user input via touch or gestures.

According to an exemplary embodiment, the processes described herein are performed by the computer system 1200, in response to the processor 1203 executing an arrangement of instructions contained in main memory 1205. Such instructions can be read into main memory 1205 from another computer-readable medium, such as the storage device 1209. Execution of the arrangement of instructions contained in main memory 1205 causes the processor 1203 to perform the process steps described herein. One or more processors in a multi-processing arrangement may also be employed to execute the instructions contained in main memory 1205. In alternative embodiments, hard-wired circuitry may be used in place of or in combination with software instructions to implement exemplary embodiments. Thus, exemplary embodiments are not limited to any specific combination of hardware circuitry and software.

The computer system 1200 also includes a communication interface 1217 coupled to bus 1201. The communication interface 1217 provides a two-way data communication coupling to a network link 1219 connected to a local network 1221. For example, the communication interface 1217 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 1217 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1217 sends and receives electrical, electromagnetic, or optical signals that carry digital data streams representing various types of information. Further, the communication interface 1217 can include peripheral interface devices, such as a Universal Serial Bus (USB) interface, a High Definition Multimedia Interface (HDMI), etc. Although a single communication interface 1217 is depicted in FIG. 12, multiple communication interfaces can also be employed.

The network link 1219 typically provides data communication through one or more networks to other data devices. For example, the network link 1219 may provide a connection through local network 1221 to a host computer 1223, which has connectivity to a network 1225 such as a wide area network (WAN) or the Internet. The local network 1221 and the network 1225 both use electrical, electromagnetic, or optical signals to convey information and instructions. The signals through the various networks and the signals on the network link 1219 and through the communication interface 1217, which communicate digital data with the computer system 1200, are exemplary forms of carrier waves bearing the information and instructions.

The computer system 1200 can send messages and receive data, including program code, through the network(s), the network link 1219, and the communication interface 1217. In the Internet example, a server (not shown) might transmit requested code belonging to an application program for implementing an exemplary embodiment through the network 1225, the local network 1221 and the communication interface 1217. The processor 1203 may execute the transmitted code while being received and/or store the code in the storage device 1209, or other non-volatile storage for later execution. In this manner, the computer system 1200 may obtain application code in the form of a carrier wave.

The term "computer-readable medium" as used herein refers to any medium that participates in providing instructions to the processor 1203 for execution. Such a medium may take many forms, including but not limited to non-volatile media, volatile media, and transmission media. Non-volatile media include, for example, optical or magnetic disks, such as the storage device 1209. Non-volatile media can further include flash drives, USB drives, microSD cards, etc. Volatile media include dynamic memory, such as main memory 1205. Transmission media include coaxial cables, copper wire and fiber optics, including the wires that comprise the bus 1201. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 13:
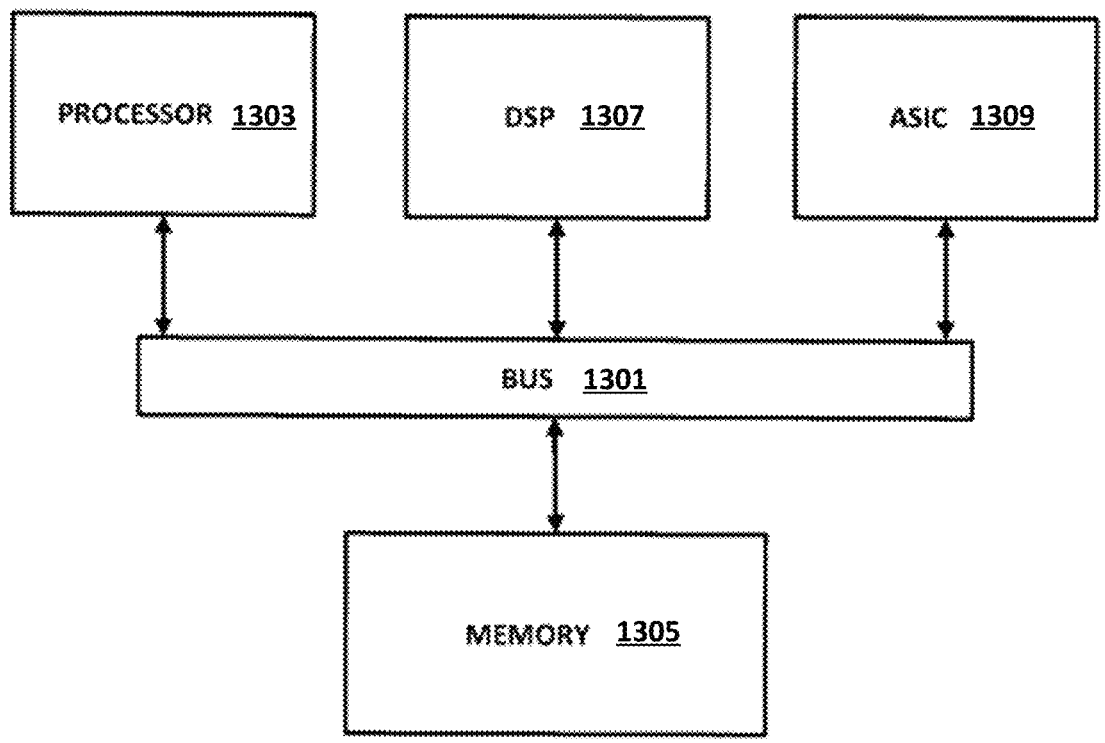
FIG. 13 is a diagram of a chip set that can be used to implement various exemplary features and embodiments.

FIG. 13 illustrates a chip set 1300 upon which features of various embodiments may be implemented. Chip set 1300 is programmed to implement various features as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1300, or a portion thereof, constitutes a means for performing one or more steps of the figures.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1209. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein. The memory 1305 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
    generating a first model for predicting RF signal degradation in a satellite communication system;
    training the first model with link quality metrics from selected terminals over a first predetermined time interval;
    generating a second model for predicting RF signal degradation in the satellite communication system resulting from weather conditions;
    training the second model with both the link quality metrics from the selected terminals and weather conditions over a second predetermined time interval;
    analyzing real time link quality metrics using the trained first model and the trained second model;
    identifying changes in current RF signal quality, based on the analysis; and
    generating at least one recommendation indicative of a cause for the identified changes in current RF signal quality.

2. The method of claim 1, wherein generating a first model comprises forming a group of terminals based on a geographical location of each terminal.

3. The method of claim 2, wherein forming a group of terminals comprises using a K-means clustering algorithm.

4. The method of claim 2, wherein generating the second model comprises recording weather information from a geographical location representative of the group.

5. The method of claim 4, wherein recording weather information comprises associating a measured performance of at least one terminal of the plurality of terminals with recorded weather conditions over the second predetermined time interval.

6. The method of claim 1, wherein the weather conditions comprise one or more of precipitation, temperature, pressure, humidity, weather category, and severity of the weather category.

7. The method of claim 1, wherein the at least one recommendation comprises a minimal set of geo coordinates at the optimal geographic locations for collecting the weather information, based on at least one of user location, user density, and user service plans.

8. The method of claim 1, wherein generating at least one recommendation further comprises:
    identifying weather patterns capable of causing network events; and
    predicting network degradations and/or outages resulting from the identified weather patterns.

9. The method of claim 1, wherein generating at least one recommendation further comprises:
    predicting impact of a weather event on current channel conditions; and
    enhancing adaptive outroute modulation to improve the transport robustness during the weather event.

10. The method of claim 1, wherein generating at least one recommendation comprises indicating the changes in current RF signal quality are due to network infrastructure conditions or weather conditions.

11. The method of claim 10, wherein generating at least one recommendation further comprises indicating the changes in current RF signal quality are normal, if the changes result in a value that is greater than the RF signal degradation value predicted by the second model.

12. The method of claim 10, wherein generating at least one recommendation further comprises:
    indicating the changes in current RF signal quality are due to network infrastructure conditions, if the changes result in a value that is lower than the RF signal degradation value predicted by the first model; and
    indicating the changes in current RF signal quality are due to weather conditions, if the changes result in a value that is between the RF signal degradation value predicted by the first model and the RF signal degradation value predicted by the second model.

13. The method of claim 1, further comprising:
repeating the steps of generating a first model, training the first model, generating a second model, and training the second model for each beam of the satellite communication system,
wherein the analyzing, identifying, and generating are performed based, at least in part, on a selected beam.

14. The method of claim 1, wherein analyzing real time link quality metrics further comprises comparing current RF signal quality to RF signal quality values predicted by the first model and the second model.

15. The method of claim 1, wherein the link quality metrics comprise one or more of stream error rate, signal quality factor, modulation and coding scheme, and energy per symbol to noise power spectral density levels.

16. An apparatus comprising:
one or more processors configured to:
generate a first model for predicting RF signal degradation in a satellite communication system;
train the first model with link quality metrics from selected terminals over a first predetermined time interval;
generate a second model for predicting RF signal degradation in the satellite communication system resulting from weather conditions;
train the second model with both the link quality metrics from the selected terminals and weather conditions over a second predetermined time interval;
analyze real time link quality metrics using the trained first model and the trained second model;
identify changes in current RF signal quality, based on the analysis; and
generate at least one recommendation indicative of a cause for the identified changes in current RF signal quality.

17. The apparatus of claim 16, wherein the processor is further configured to form a group of terminals based on a geographical location of each terminal.

18. The apparatus of claim 16, wherein the processor is further configured to generate at least one recommendation by indicating the changes in current RF signal quality are due to network infrastructure conditions or weather conditions.

19. The apparatus of claim 18, wherein the processor is further configured to indicate the changes in current RF signal quality are normal, if the changes result in a value that is greater than the RF signal degradation value predicted by the second model.

20. The apparatus of claim 18, wherein the processor is further configured to generate the at least one recommendation by:
indicating the changes in current RF signal quality are due to network infrastructure conditions, if the changes result in a value that is lower than the RF signal degradation value predicted by the first model; and
indicating the changes in current RF signal quality are due to weather conditions, if the changes result in a value that is between the RF signal degradation value predicted by the first model and the RF signal degradation value predicted by the second model.

* * * * *